M. J. O'CONNOR.
RESILIENT TIRE.
APPLICATION FILED MAY 3, 1921.

1,405,859. Patented Feb. 7, 1922.

Inventor
Michael J. O'Connor

By  *(signature)*
Attorney

UNITED STATES PATENT OFFICE.

MICHAEL J. O'CONNOR, OF BLOOMINGDALE, NEW JERSEY.

RESILIENT TIRE.

1,405,859.   Specification of Letters Patent.   Patented Feb. 7, 1922.

Application filed May 3, 1921. Serial No. 466,592.

*To all whom it may concern:*

Be it known that I, MICHAEL J. O'CONNOR, a citizen of the United States, residing at Bloomingdale, in the county of Passaic and State of New Jersey, have invented certain new and useful Improvements in Resilient Tires, of which the following is a specification.

My said invention relates to a new and improved resilient tire structure for devices such as heavy automobile trucks and is an improvement on the devices shown in my prior application No. 292,451, April 23, 1919.

It is an object of my invention to provide a resilient tire which shall combine the advantages of the pneumatic tire and the solid tire such as are in ordinary use, which shall wear well and be highly resilient, at the same time being substantially puncture-proof.

Figure 1:
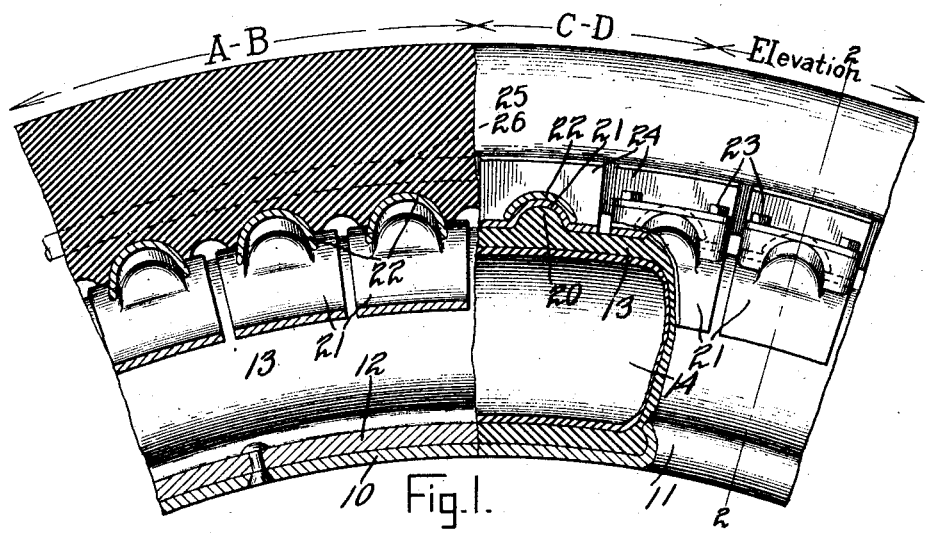
Figure 2:
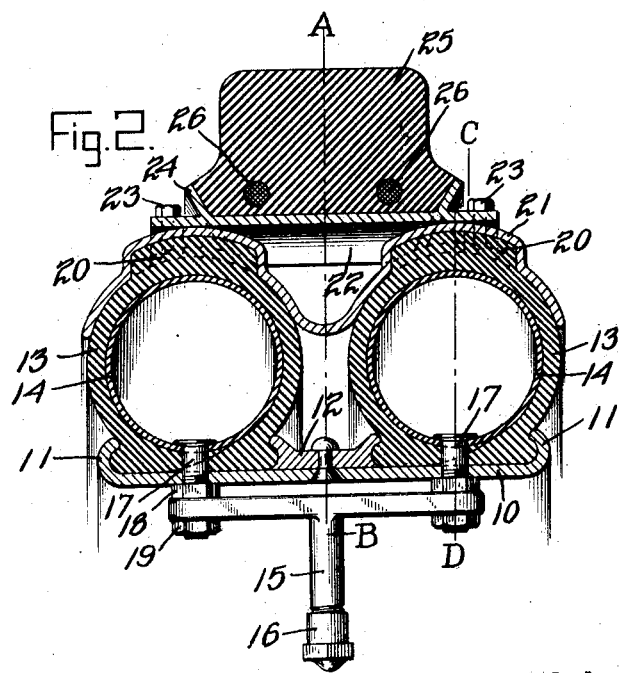

Referring to the accompanying drawings which are made a part hereof and on which similar reference characters indicate similar parts, Figure 1 is an elevation of a portion of a tire with parts broken away as indicated by the lines A—B and C—D of Figure 2, and Figure 2 is a section of the tire on line 2—2 of Figure 1.

In the drawings 10 indicates a rim of any ordinary type having flanges 11 at its sides and a clamping device 12 at the middle attached to the rim by rivets or other convenient means, the flanges and clamp being intended to hold in place a pair of pneumatic tires 13 of any ordinary type here shown as clincher tires. The tires 13 encase tire tubes 14 in the usual manner and the tire tubes are adapted to be inflated by means of an air inlet 15 having a cap 16. This inlet at its lower end comprises two branches which extend into operative relation to pipes 17. The pipes 17 are held in place on the rim by nuts 18 and the branches of inlet pipe 15 are held between nuts 18 and 19.

On their peripheral surfaces the tires 13 have enlargements 20. A series of metallic plates 21 are formed to fit over these enlargements and engage closely with both of the tires. A second series of metallic plates 22 corresponding in number to the plates 21 are formed to engage closely the bent-up portions of plates 21 and are secured thereto by screws 23 passing through perforations at the outer ends of plates 22 and engaging threaded openings in the thickened parts of plates 21. These units 22 have inclined side flanges 24 engaging the beveled lower edges of a tread, shown in the drawings as a solid endless tire 25 which may be molded in place on the units 22 if desired or the parts may be assembled in other ways. The tire 25 has wires 26 extending circumferentially thereof and also has transverse slots on its inner face to accommodate the bulged portions of plate 23.

The tire 25 takes the ordinary wear of the road and is made of any ordinary material, preferably rubber, and may have any desired form and structure.

The outer tire is resiliently supported by the pneumatic tires which on the other hand are protected from wear by the solid outer tire. The interposed members 21 and 22 provide means for holding the tires 13 and 25 securely in relative position and yet are well adapted to permit relative movement of parts by reason of their large number and their spaced relation to each other. When the tires 13 are deflated tire 25 may readily be removed from the wheel and repaired or replaced. It will seldom be necessary to remove parts 22, 21 and the resilient tires or their elements but if it should become necessary this can also be done without difficulty after the tire 25 has been removed. Tire 25 may, if desired, be formed in segments held on plates 22 and these segments may extend over only one such plate, or over a plurality of plates, as may be found expedient.

Having thus fully described my said invention, what I claim as new and desire to secure by Letters Patent, is:

1. In a tire structure, a pair of pneumatic tires having irregularities at intervals on their peripheral surfaces, connecting means extending across said pair of tires adapted to engage said irregularities and prevent relative sidewise movement of the tires and a tread surrounding said devices and held in place thereby, substantially as set forth.

2. In a tire structure, a rim, a plurality of pneumatic tires supported thereby, a tread concentric with said tires and spaced connecting devices interposed between said tread and said tires to hold the tread flexibly in place, substantially as set forth.

3. In a tire structure, a plurality of pneumatic tires having spaced raised portions on their peripheral surfaces, a series of metallic plates extending across two or more of said tires and having sockets to fit said enlargements, a tread encircling said pneumatic tires, and means for holding said tread against lateral movement relative to said plates, substantially as set forth.

4. In a tire structure, a plurality of pneumatic tires having raised portions on their peripheral surfaces, a series of metallic plates extending across said tires and having sockets to fit said enlargements, a tread encircling said pneumatic tires, and means for holding said tread against movement relative to said plates comprising a second series of plates having portions engaging the tread to prevent relative lateral movement between the plates of said second series and the tread, substantially as set forth.

5. In a tire structure, a rim, a plurality of clincher tires fast thereto and having enlargements on their peripheral surfaces, a series of spaced metallic plates closely engaging said pheripheral surfaces and the enlargements thereon, a second series of spaced metallic plates respectively affixed to the plates of the first series to prevent relative movement thereof and a solid tire carried by the plates of said second series, substantially as set forth.

6. In a tire structure, a rim, a plurality of clincher tires fast thereto and having enlargements on their peripheral surfaces, a series of spaced metallic plates closely engaging said peripheral surfaces and the enlargements thereon, a second series of plates respectively attached to the plates of said first series to prevent lateral movement, the plates of said second series having outwardly extending flanges and a solid tire supported by said plates and held against lateral movement by said flanges, substantially as set forth.

7. In a tire structure, a rim having side flanges, a plurality of clincher tires thereon, clamping means between the tires comprising a flange for engagement with each tire to cooperate with the flanges of the rim, a plurality of rigid spaced connecting units supported on said tires and extending across a plurality thereof, wires extending circumferentially of the units and a tread held in place on the units by said wires, substantially as set forth.

In witness whereof, I have hereunto set my hand and seal at Bloomingdale, New Jersey, this 9th day of April, A. D. nineteen hundred and twenty-one.

MICHAEL J. O'CONNOR. [L. S.]

Witnesses:
    EDWARD J. DUNN,
    CLARENCE KAHMAN.